US007027444B2

(12) United States Patent
Kim et al.

(10) Patent No.: US 7,027,444 B2
(45) Date of Patent: Apr. 11, 2006

(54) APPARATUS AND METHOD FOR GENERATING A PREAMBLE SEQUENCE IN A WIRELESS COMMUNICATION SYSTEM

(75) Inventors: Jae-Yoel Kim, Kunpo-shi (KR); Hyun-Woo Lee, Suwon-shi (KR); Jung-Je Son, Seoul (KR)

(73) Assignee: Samsung Electronics Co., Ltd., (KR)

( * ) Notice: Subject to any disclaimer, the term of this patent is extended or adjusted under 35 U.S.C. 154(b) by 877 days.

(21) Appl. No.: 09/990,557

(22) Filed: Nov. 21, 2001

(65) Prior Publication Data
US 2002/0114355 A1  Aug. 22, 2002

(30) Foreign Application Priority Data
Nov. 21, 2000 (KR) .............................. 2000-71092

(51) Int. Cl.
*H04L 12/28* (2006.01)
*H04B 7/216* (2006.01)
(52) U.S. Cl. ................. 370/394; 370/537; 370/441; 370/347; 370/350; 370/337; 370/335; 370/342; 708/250; 708/252
(58) Field of Classification Search ............ 375/145, 375/149; 370/335, 342; 708/250, 252
See application file for complete search history.

(56) References Cited

U.S. PATENT DOCUMENTS
3,947,674 A * 3/1976 Gutleber ................. 708/250
5,559,829 A  9/1996 Le Strat et al.

FOREIGN PATENT DOCUMENTS
WO  WO 99/33212  7/1999

OTHER PUBLICATIONS
Srdjan Budisin, Institute of Microwave Techniques and Electronics, "Golay Complementary Sequences are Superior to PM Sequences", Sep. 17, 1992.

* cited by examiner

*Primary Examiner*—Chi Pham
*Assistant Examiner*—Christopher Grey
(74) *Attorney, Agent, or Firm*—Dilworth & Barrese LLP (57) ABSTRACT

Disclosed is an apparatus for creating an aperiodic recursive multiplex (ARM) code having a predetermined length by receiving a first sequence having a given length. The apparatus outputs a third sequence by multiplying the first sequence by a second sequence alternating between +1 and −1, the second sequence being identical in length to the first sequence. A fourth sequence is output by time-multiplexing the first sequence and the third sequence.

8 Claims, 8 Drawing Sheets

APPARATUS AND METHOD FOR GENERATING A PREAMBLE SEQUENCE IN A WIRELESS COMMUNICATION SYSTEM

PRIORITY

This application claims priority to an application entitled "Apparatus and Method for Generating Preamble Sequence in a Wireless Communication System" filed in the Korean Industrial Property Office on Nov. 21, 2000 and assigned Ser. No. 2000-71092, the contents of which are hereby incorporated by reference.

BACKGROUND OF THE INVENTION

1. Field of the Invention

The present invention relates generally to an apparatus and method for creating a preamble sequence for use in a wireless communication system, and in particular, to an apparatus and method for creating a preamble sequence indicating frame synchronization or existence of data.

2. Description of the Related Art

In general, a wireless communication system refers to a system supporting a radio communication service, and the wireless communication system includes UTRANs (UMTS (Universal Mobile Telecommunication Systems) Terrestrial Radio Access Network) and Us (User Equipments) for the wireless communication. The UTRAN and the UE perform the wireless communication using transport frames, requiring them to be synchronized with each other for exchange of the transport frames. To this end, the UTRAN transmits a sync (synchronization) signal so that the UB may recognize a start point of the frame. The UE then checks frame timing of the UTRAN by receiving the sync signal transmitted by the UTRAN.

A specific preamble sequence previously chosen by the UTRAN and the UE is typically used for the sync signal. When the preamble sequence indicating the frame timing is transmitted on a burst-by-burst basis (intermittently), not continuously, reception performance (capability) of the preamble sequence depends upon an aperiodic autocorrelation characteristic.

In addition, a sequence indicating slot synchronization is used for the preamble sequence for acquisition of the frame timing. A W-CDMA (Wideband Code Division Multiple Access) UMTS system, an FDD (Frequency Division Duplexing) UMTS system and a TDD (Time Division Duplexing) UMTS system have a plurality of slots in each frame. Therefore, the FDD UMTS system has a slot sync signal indicating a start point (synchronization) of a slot, while the TDD UMTS system has a midamble signal in every slot for synchronization of the slot. Like the frame sync signal, the slot sync signal and the midamble signal are also previously chosen by the UTRAN and the UE, and transmitted intermittently.

Further, a BRAN (Broadband Radio Access Network) system (or BRAN hyper access system) employing the W-CDMA technique transmits data to a plurality of users by dividing the frame on a time division basis. Even in the BRAN system, a frame preamble indicating a start of the frame exists in a specific period beginning at the start point of the frame. In addition, since the data for the respective users may be transmitted irregularly in one frame, a burst preamble indicating a start point of the data exists at the head of the data. Therefore, the UE should receive the data preamble in order to recognize the transmission start point of the data. That is, the UE should acquire synchronization on the start point of the data in order to receive the data. For the synchronization, the UE acquires the preamble signal used in common by every system, before receiving the data. A frame format including the preamble signal will be described with reference to FIG. 1.

Figure 1:
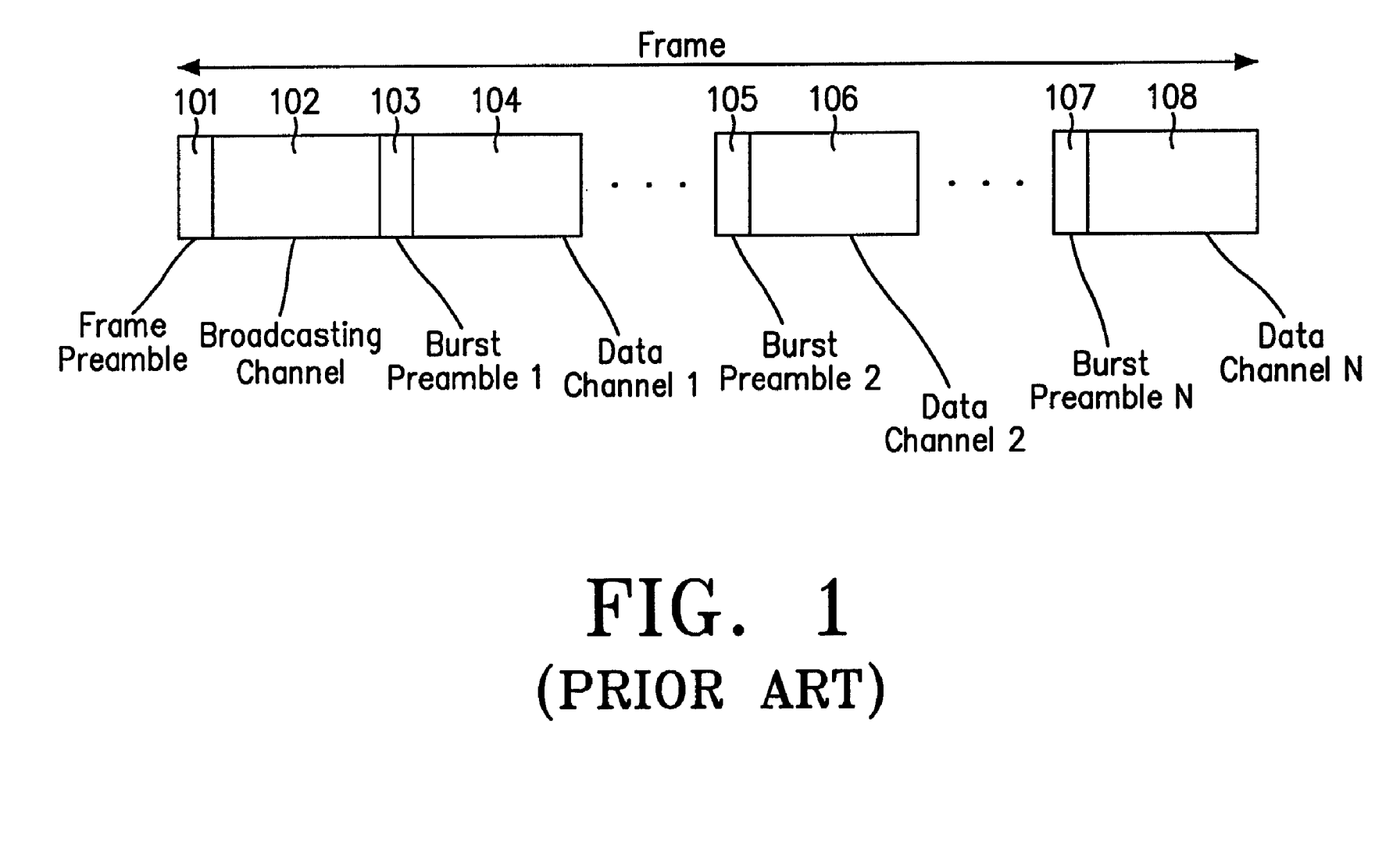
FIG. 1 illustrates a common frame format used in a BRAN system.

FIG. 1 illustrates a common frame format used in the BRAN system. Referring to FIG. 1, a frame preamble 101 represents a start point of a frame, used in detecting synchronization of a signal from the UTRAN. The frame preamble 101 is subject to QPSK (Quadrature Phase Shift Keying) modulation before being transmitted. A broadcasting channel (BCH) 102 is used to broadcast system information required during BRAN communication to every UE in a coverage of the UTRAN. A first burst preamble 103 represents a start point of intermittently transmitted first burst data. A first data channel 104 represents a part for transmitting first data. The first data transmitted over the first data channel 104 is subject to any one of QPSK (Quadrature Phase Shift Keying), 16 QAM (16-ary Quadrature Amplitude Modulation) and 64 QAM (64-ary Quadrature Amplitude Modulation) modulations before transmission. The frame format, as illustrated in FIG. 1, includes N burst preambles and N succeeding data channels.

In the foregoing description, the system uses sequences (preambles) indicating frame synchronization, slot synchronization or existence of data, which are previously chosen by the UTRAN (transmitter) and the UE (receiver) according to the communication standard. Since the sequences are intermittently transmitted on a burst basis, the sequences have a good aperiodic autocorrelation characteristic. A structure of a common preamble transmitter will be described with reference to FIG. 2.

Figure 2:
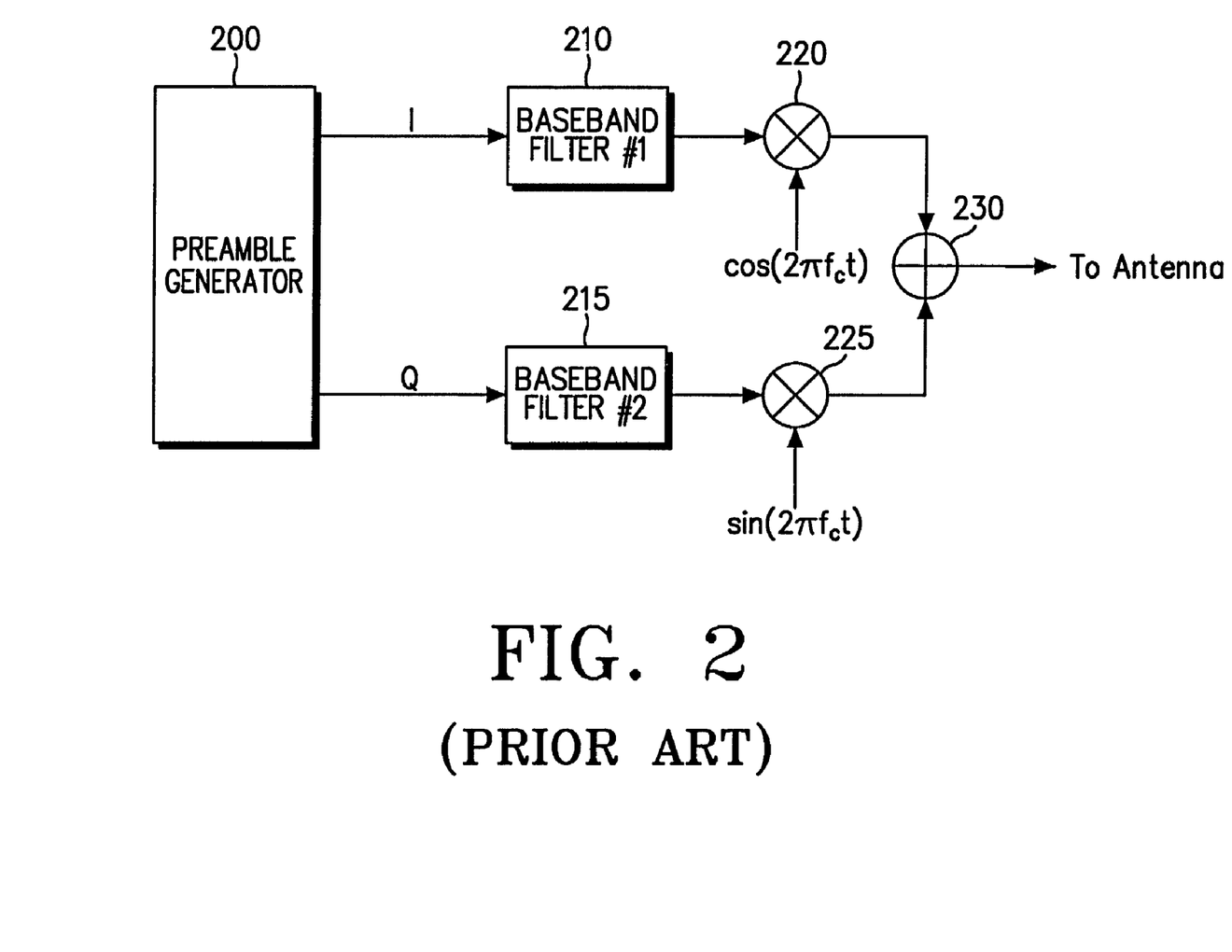
FIG. 2 illustrates a structure of a common preamble transmitter for transmitting a preamble in a UTRAN.

FIG. 2 illustrates a structure of a preamble transmitter for transmitting a preamble in a UTRAN. Referring to FIG. 2, a preamble generator 200 generates a complex preamble signal and provides the generated complex preamble signal to a first baseband filter 210 and a second baseband filter 215. Specifically, an I (In-phase) sequence signal, a real component signal of the preamble signal generated from the preamble generator 200, is provided to the first baseband filter 210, while a Q (Quadrature-phase) sequence signal, an imaginary component signal of the preamble signal, is provided to the second baseband filter 215. The first baseband filter 210 and the second baseband filter 215 filter the I signal and the Q signal provided from the preamble generator 200 into I and Q-arm baseband signals, respectively. The baseband signal output from the first baseband filter 210 is provided to a multiplier 220, while the baseband signal output from the second baseband filter 215 is provided to a multiplier 225. The multiplier 220 multiplies the signal output from the first baseband filter 210 by a carrier signal $\cos(2\pi f_c t)$, and provides its output signal to an adder 230. Further, the multiplier 225 multiplies the signal output from the second baseband filter 215 by a carrier signal $\sin(2\pi f_c t)$, and provides its output signal to the adder 230. The adder 230 adds the signal output from the multiplier 220 to the signal output form the multiplier 225, and provides its output signal to an antenna (not shown). In the conventional preamble transmitter of FIG. 2, the preamble is transmitted after being subject to QPSK modulation without any error correcting information added thereto.

Next, a structure of a common preamble receiver will be described with reference to FIG. 3.

Figure 3:
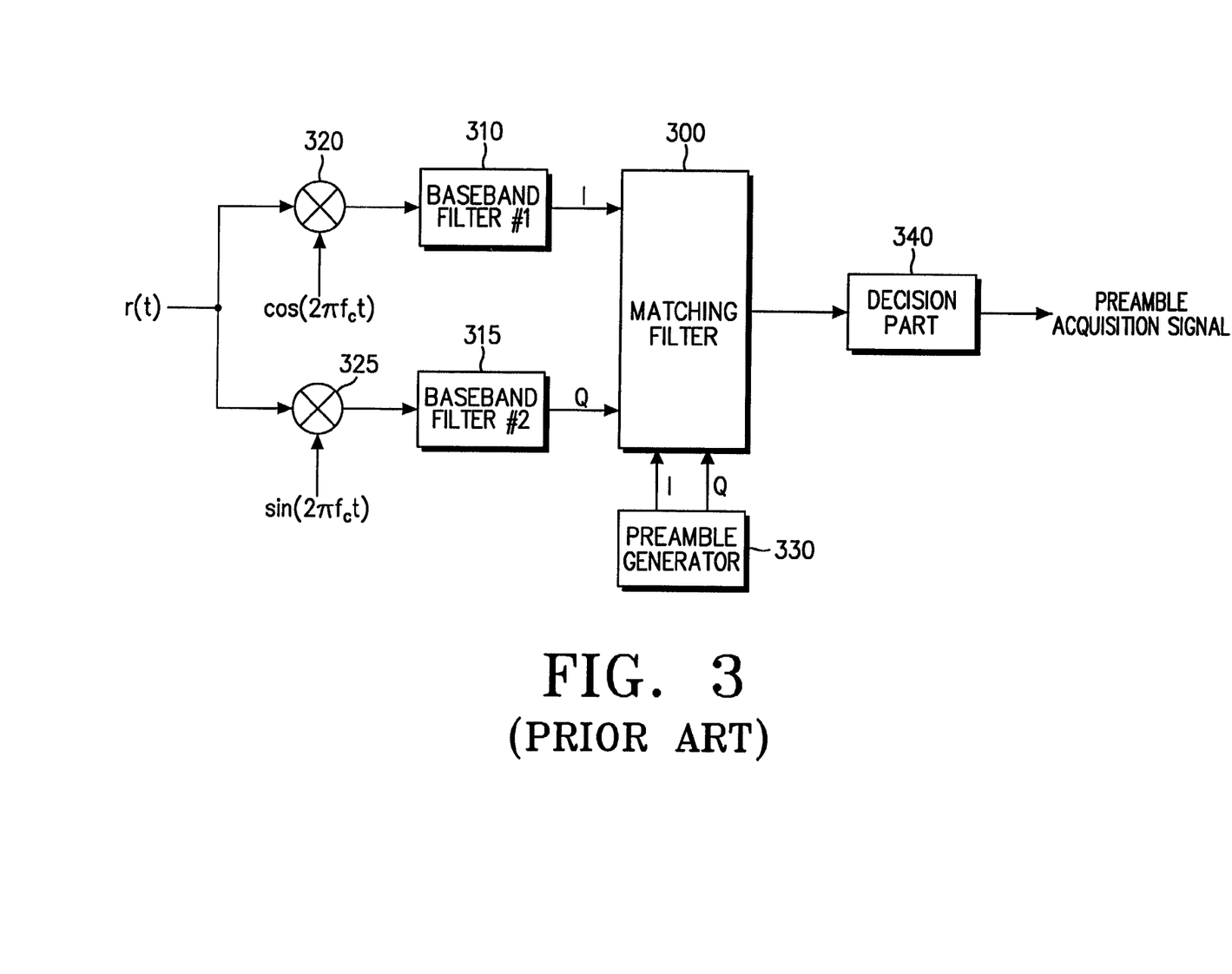
FIG. 3 illustrates a structure of a common preamble receiver in a UE, for detecting a preamble transmitted from the transmitter.

FIG. 3 illustrates a structure of a preamble receiver in a UE, for detecting a preamble transmitted from the transmitter. In FIG. 3, an RF (Radio Frequency) part, an IF (Intermediate Frequency) part and a filtering part are omitted, for convenience sake.

Referring to FIG. 3, a received RF signal r(t) is provided to multipliers 320 and 325. The multiplier 320 multiplies the signal r(t) by a carrier signal $\cos 2\pi f_c t$ for down conversion, and provides a down-converted I-component signal to a first baseband filter 310. Further, the multiplier 325 multiplies the signal r(t) by a carrier signal $\sin 2\pi f_c t$ for down conversion, and provides a down-converted Q-component signal to a second baseband filter 315. The first baseband filter 310 filters the signal output from the multiplier 320 and provides its output signal to a matching filter 300 as an I-component signal. The second baseband filter 315 filters the signal output from the multiplier 325 and provides its output signal to the matching filter 300 as a Q-component signal. A preamble generator 330 creates an I-component preamble signal and a Q-component preamble signal and provides the created preamble signals to the matching filter 300. The matching filter 300 detects a correlation between the I and Q-component signals output from the first and second baseband filters 310 and 315 and the I and Q-component preamble signals output from the preamble generator 330, and then provides the detected correlation value to a decision part 340. The decision part 340 compares the correlation value output from the matching filter 300 with a unique absolute threshold previously set in the receiver. As the result of the comparison, if the correlation value output from the matching filter 300 is higher than or equal to the threshold, the decision part 340 outputs a preamble acquisition indication signal. Otherwise, if the correlation value output from the matching filter 300 is lower than the threshold, the decision part 340 outputs a preamble acquisition failure signal.

The conventional receiver, as described above, uses the correlation characteristic in order to detect the preamble. In this case, the preamble detection performance depends upon the aperiodic autocorrelation characteristic of the preamble. Therefore, as mentioned above, it is necessary to use a code having a good aperiodic autocorrelation characteristic for the preamble signal aimed at reception synchronization.

As described above, the preamble used in the BRAN system is classified into a frame preamble for indicating a start point of one frame and a burst preamble for indicating a transmission start point of burst data. A downlink frame preamble signal among the frame preambles should have a length of at least 32 bits, and a downlink burst preamble signal among the burst preambles should have a length of at least 16 bits. In addition, an uplink burst preamble signal among the burst preambles should have a length of at least 32 bits. That is, even the same system requires the preamble signals having various lengths. In creating the preamble signals having various lengths, it is preferable to use a common preamble generator rather than using a plurality of separate preamble generators for creating preamble signals having different lengths.

SUMMARY OF THE INVENTION

It is, therefore, an object of the present invention to provide an apparatus and method for creating a frame preamble sequence in a wireless communication system.

It is another object of the present invention to provide an apparatus and method for creating a preamble sequence used to detect synchronization in a wireless communication system.

It is further another object of the present invention to provide an apparatus and method for creating burst preamble sequence used to detect a data start point in a wireless communication system.

It is yet another object of the present invention to provide an apparatus and method for simultaneously creating a frame preamble sequence and a burst reamble sequence in a wireless communication system.

It is still another object of the present invention to provide an apparatus and method for creating a preamble sequence having a good aperiodic autocorrelation characteristic in a wireless communication system.

To achieve the above and other objects, there is provided a method for creating an aperiodic recursive multiplex (ARM) code having a predetermined length by receiving a first sequence having a given length. The method comprises the steps of (a) outputting a third sequence by multiplying the first sequence by a second sequence alternating between +1 and −1, the second sequence being identical in length to the first sequence; (b) outputting a fourth sequence by time-multiplexing the first sequence and the third sequence; (c) re-designating the fourth sequence as the first sequence, until the length of the fourth sequence is not identical to the predetermined length, and then returning to the step (a); and (d) outputting the fourth sequence as the ARM code, when the length of the fourth sequence is identical to the predetermined length. The first sequence is created by a selected one of possible 2-bit combinations.

Further, to achieve the above and other objects, there is provided an apparatus for creating an aperiodic recursive multiplex (ARM) code having a predetermined length by receiving a first sequence having a given length. The apparatus comprises: a multiplier for outputting a third sequence by multiplying the first sequence by a second sequence alternating between +1 and −1, the second sequence being identical in length to the first sequence; a multiplexer for time-multiplexing the first sequence and the third sequence; and a controller for re-designating a sequence output from the multiplexer as the first sequence and re-inputting the re-designated sequence to the multiplier and the multiplexer until the ARM code having the predetermined length is created.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

A preamble sequence according to an embodiment of the present invention can be applied to a BRAN system, for which communication standardization is under way. The "preamble sequence" newly proposed by the embodiment of the present invention will be referred to an "aperiodic recursive multiplex (ARM) code". The embodiment of the present invention provides an apparatus and method for generating an ARM code used in checking system synchronization, frame synchronization, slot synchronization or existence of data. Further, embodiments of the present invention will be described with reference to a frame preamble or a burst preamble used in the BRAN system. In addition, the ARM code can be applied to any system, which is required to use a sequence having an excellent aperiodic autocorrelation characteristic.

In addition, for the frame preamble or the burst preamble, the BRAN system uses a preamble signal having a good correlation characteristic and also having a length of an exponential power of 2. This is because a reduction in acquisition performance of the preamble signal makes it difficult to detect synchronization, thus disabling radio communication between a transmitter and a receiver. Further, upon failure to detect the burst preamble indicating existence of the data, the receiver cannot receive the data. In addition, it should be noted that the preamble is transmitted on a burst-by-burst basis (intermittently), not continuously.

Figure 5:
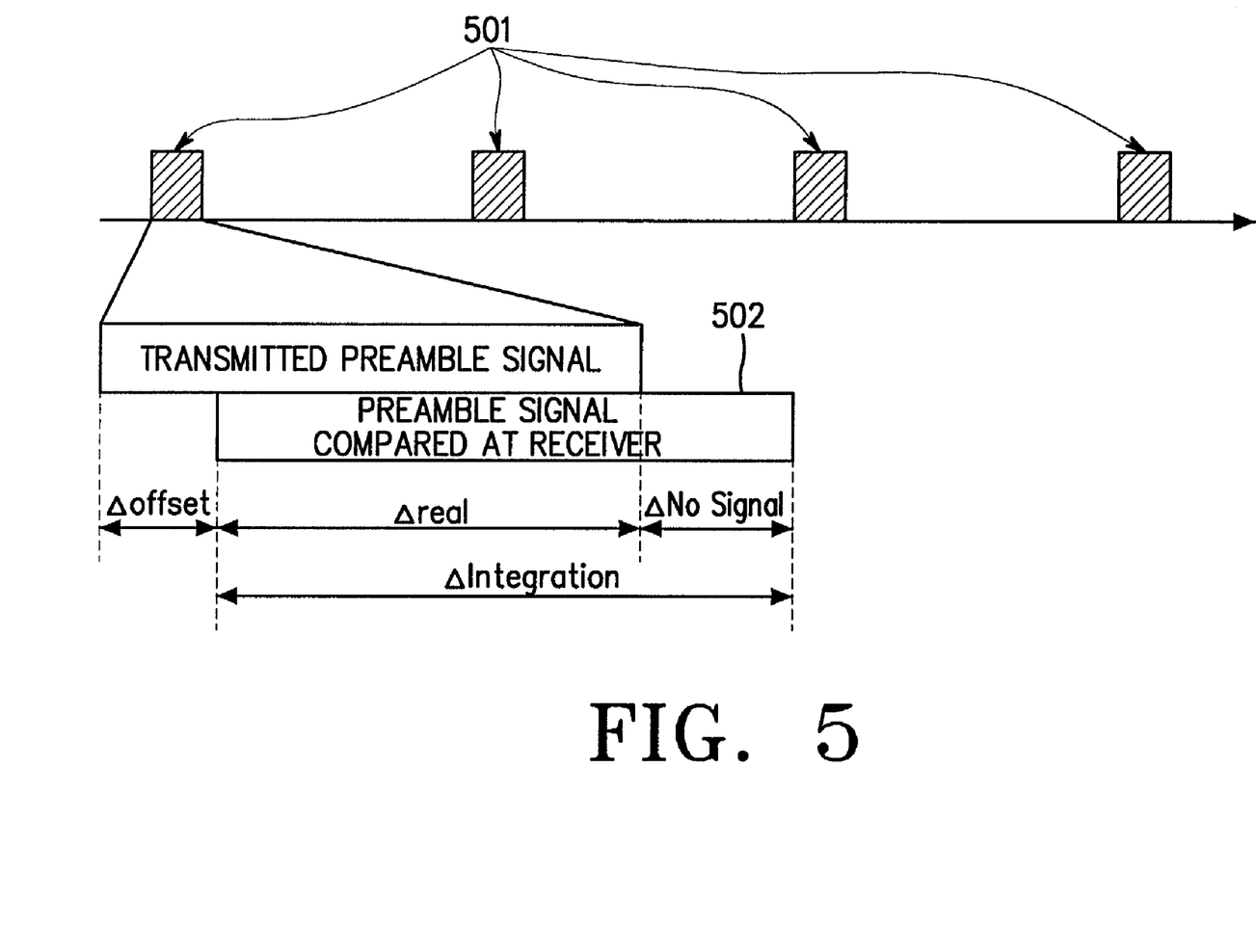
FIG. 5 illustrates a method of measuring a correlation for the signals transmitted from a transmitter on a burst basis.

With reference to FIG. 5, a description will be made regarding how the receiver measures a correlation for the preambles transmitted from the transmitter on a burst basis. FIG. 5 illustrates how a receiver measures a correlation for the signals transmitted from a transmitter on a burst basis. Specifically, FIG. 5 illustrates a method for measuring a correlation in a state where a transmitter transmitting a preamble on a burst basis is not correctly synchronized with a receiver receiving the preamble signal transmitted from the transmitter.

Referring to FIG. 5, the transmitter first transmits preamble signal 501 to the receiver on a burst basis. Here, since the receiver does not know start points of the preamble signal 501 transmitted by the transmitter, the receiver will continuously calculate a correlation between a signal received for a time $\Delta_{integration}$ corresponding to a length of the preamble signal 501 beginning at a given time point and a preamble signal previously set in the receiver. The set preamble signal is a signal previously set by agreement between the receiver, i.e., the UE, and the transmitter, i.e., the UTRAN.

That is, FIG. 5 illustrates a situation where an actual transmission time period of the preamble signal 501 does not coincide with a period where the receiver calculates the correlation. If a time difference between the actual transmission time period of the preamble signal 501 and the time period where the receiver calculates the correlation is $\Delta_{offset}$, correlation between the preamble signal transmitted from the transmitter and the set preamble signal generated in the receiver is performed only for a time period $\Delta_{real}$ of the interval $\Delta_{integration}$ where the receiver calculates a correlation between the received preamble signals and the set preamble signal. Since there is no preamble signal transmitted from the transmitter for the period $\Delta_{offset}$ and a period $\Delta_{no-signal}$ identical in length to the period $\Delta_{offset}$, comparison between the preamble signal transmitted from the transmitter and the set preamble signal generated in the receiver is not performed. Therefore, the actual correlation value is equal to a correlation value during the period $\Delta_{real}$ of the $\Delta_{integration}$. This can be represented by $$Cor = \sum_{\Delta_{real}} r(t) \cdot s^*(t) \qquad \text{Equation (1)}$$

In Equation (1), Cor represents a correlation value, r(t) represents a received signal, s(t) represents a set preamble signal generated in the receiver, and s*(t) represents a conjugate complex number of the s(t).

More specifically, if the difference $\Delta_{offset}$ between the actual transmission time period of the preamble signal and the time period where the receiver calculates the correlation is τ, Equation (1) can be expressed as $$Cor = \sum_{t=0}^{N-\tau} s(t) \cdot s^*(t+\tau) \qquad \text{Equation (2)}$$

In equation (2), N represents a length of the preamble, which is equal to the time period $\Delta_{integration}$.

Generally, when calculating the correlation value of a sequence s(t), the sequence is called an "aperiodic sequence". The aperiodic sequence used for the preamble signal is an excellent sequence having a low correlation value, when the time offset $\Delta_{offset}$ has the value τ. That is, the excellent sequence has a lower correlation value when the synchronization is not acquired, and has a higher correlation value only when the synchronization is acquired. However, an aperiodic sequence actually having excellent performance is not well known. Therefore, the present invention provides a method for creating a code having an excellent performance in terms of the aperiodic sequence. The aperiodic sequence, a preamble signal provided by the present invention, can be considered as an excellent aperiodic sequence, when its length N is 2n (N=2n).

Reference will now be made to several characteristics of the aperiodic sequence in order to describe the method for creating the aperiodic sequence having the excellent property according to the present invention.

In general, a correlation $C_\tau$ for an aperiodic sequence $\{a_i\}$ having a length N is represented by $$C_\tau = \sum_{i=0}^{N-\tau} a(i) \cdot a^*(i+\tau) \qquad \text{Equation (3)}$$

In Equation (3), if the aperiodic sequence having a length N is $\{(-1)^i \cdot a_i\}$, a correlation $C'_\tau$ for the $\{(-1)^i \cdot a_i\}$ is represented by $$C'_\tau = \sum_{i=0}^{N-\tau}(-1)^i a(i) \cdot (-1)^{1-\tau} a^*(i+\tau) \quad \text{Equation (4)}$$

$$= \sum_{i=0}^{N-\tau}(-1)^{21 \times \tau} a(i) \cdot a^*(i+\tau)$$

$$= \sum_{i=0}^{N-\tau}(-1)^\tau a(i) \cdot a^*(i+\tau)$$

$$= (-1)^\tau \sum_{i=0}^{N-\tau} a(i) \cdot a^*(i+\tau)$$

$$= (-1)^\tau \cdot C_\tau$$

In the following description, the aperiodic sequence $\{(-1)^i \cdot a_i\}$ having a length N will be referred to as "$b_i$". Then, a correlation $Cor_\tau$ for a complex aperiodic sequence $\{a_i + jb_i\}$ having a length N can be represented by $$Cor_\tau = \sum_{i=0}^{N-\tau}(a(i)+jb(i)) \cdot (a(i+\tau)+jb(i+\tau))^* \quad \text{Equation (5)}$$

$$= \sum_{i=0}^{N-\tau}(a(i)+j(-1)^i a(i)) \cdot (a(i+\tau)+j(-1)^{1-\tau} a(i+\tau))^*$$

$$= \sum_{i=0}^{N-\tau}(a(i)a(i+\tau)+(-1)^\tau a(i)a(i+\tau)) +$$

$$j\sum_{i=0}^{N-\tau}(a(i)a(i+\tau)-(-1)^\tau a(i)a(i+\tau))(-1)^i$$

Figure 6:
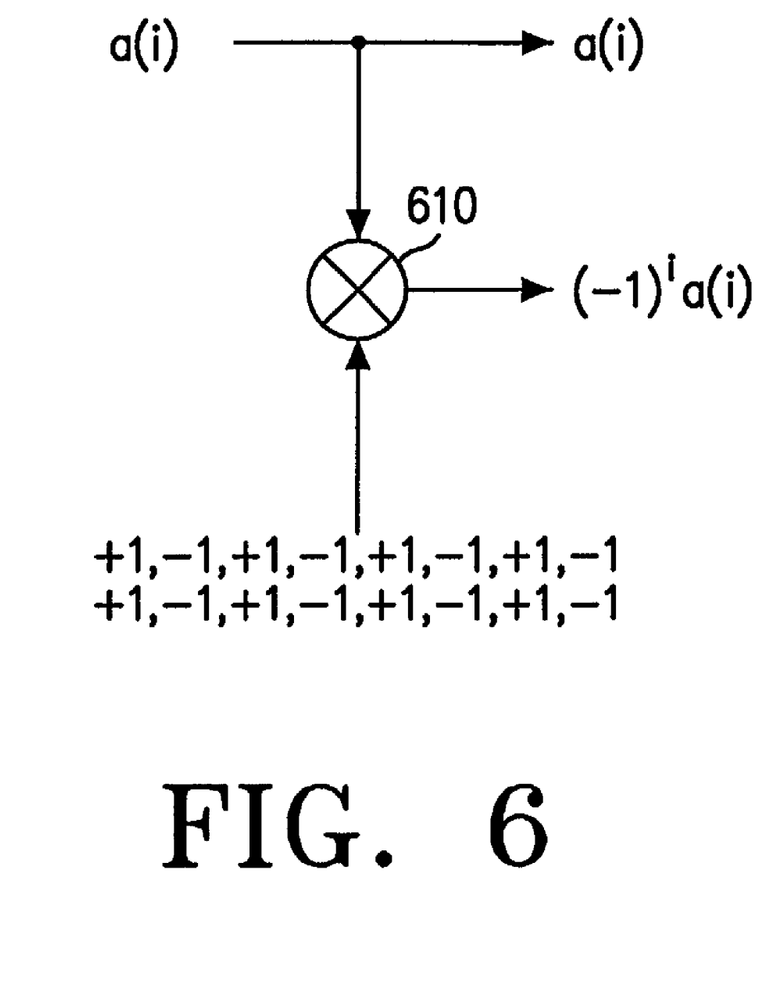
FIG. 6 illustrates a fundamental structure of a preamble generating apparatus according to an embodiment of the present invention.

Equation (5) can be implemented by a hardware structure of FIG. 6. With reference to FIG. 6, a description will be made of a fundamental structure of a preamble generating apparatus according to an embodiment of the present invention.

FIG. 6 illustrates a fundamental structure of a preamble generating apparatus according to an embodiment of the present invention. Referring to FIG. 6, upon receiving a sequence a(i) (where i=1, 2, . . . , 16) having a length N (e.g., N=16), the apparatus outputs the intact sequence a(i) as an I component. The sequence a(i) is provided to a multiplier 610, and at the same time, a signal of +1, −1, +1, −1, +1, −1, +1, −1, +1, −1, +1, −1, +1, −1, +1, −1, having a length N=16, is also provided to the multiplier 610. The multiplier 610 multiplies the sequence a(i) by the signal of +1, −1, +1, −1, +1, −1, +1, −1, +1, −1, +1, −1, +1, −1, +1, −1, on an element-by-element basis, and generates its output $\{(-1)^i a(i)\}$ as a Q component.

In Equation (4), a real part value and an imaginary part value can be considered separately. In order for the correlation value to become as small as possible, the real part and the imaginary part should both have their possible minimum values. Referring to Equation (4), if τ is an even number, the imaginary part becomes '0' but the real part does not become '0'. In contrast, if τ is an odd number, the imaginary part does not become '0' but the real part becomes '0'. Actually, in the case of the aperiodic sequence, it is not possible that both the real part and the imaginary part have a correlation value of '0'. Therefore, a method for setting the real part to a possible minimum value will be described below.

If the real part of Equation (5) is called "I", Equation (5) can be expressed as $$I = \sum_{i=0}^{N-\tau} a(i)a(i+\tau) + (-1)^\tau \sum_{i=0}^{N-\tau} a(i)a(i+\tau) \quad \text{Equation (6)}$$

$$= C_\tau + (-1)^\tau C_\tau$$

In Equation (6), if τ, indicating the difference $\Delta_{offset}$ between the actual transmission time period and the period where the receiver calculates the correlation, is an odd number, the real part I becomes '0'. Otherwise, if τ is an even number, then $$I = 2\sum_{i=0}^{N-\tau} a(i)a(i+\tau).$$

Therefore, in order to make the I value become '0' when τ is an even number, the following process is repeatedly performed. That is, the phrase—

$$2\sum_{i=0}^{N-\tau} a(i)a(i+\tau)$$

becomes '0' when τ is an even number—means that a correlation determined when an aperiodic sequence of length N having the real value has an even offset is '0'. Therefore, the following properties are used.

The a(i) for an aperiodic sequence d(i) of length N/2 having a certain real value will be defined as $$a(i) = \begin{cases} d(k), & i = 2k \\ (-1)^k d(k), & i = 2k+1 \end{cases} \quad k = 0 \text{ to } (N/2)-1 \quad \text{Equation (7)}$$

In Equation (7), if τ=2τ' is an even number, the real part value can be calculated by $$I = 2\sum_{i=0}^{N-\tau} a(i)a(i+\tau) \quad \text{Equation (8)}$$

$$= 2\sum_{i=0}^{N-2\tau'} a(i)a(i+2\tau')$$

$$= 2\sum_{k=0}^{(N-\tau)/2} a(2k)a(2k+2\tau') +$$

$$2\sum_{k=0}^{(N-\tau)/2} a(2k+1)a(2k+1+2\tau')$$

$$= 2\sum_{k=0}^{(N-\tau)/2} d(k)d(k+\tau') +$$

$$2\sum_{k=0}^{(N-\tau)/2} (-1)^k d(k)(-1)^{k+\tau'} d(k+\tau')$$

$$= 2\sum_{k=0}^{(N-\tau)/2} d(k)d(k+\tau') +$$

-continued $$2(-1)^{\tau'} \sum_{k=0}^{(N-\tau)/2} d(k)d(k+\tau')$$

Figure 7:
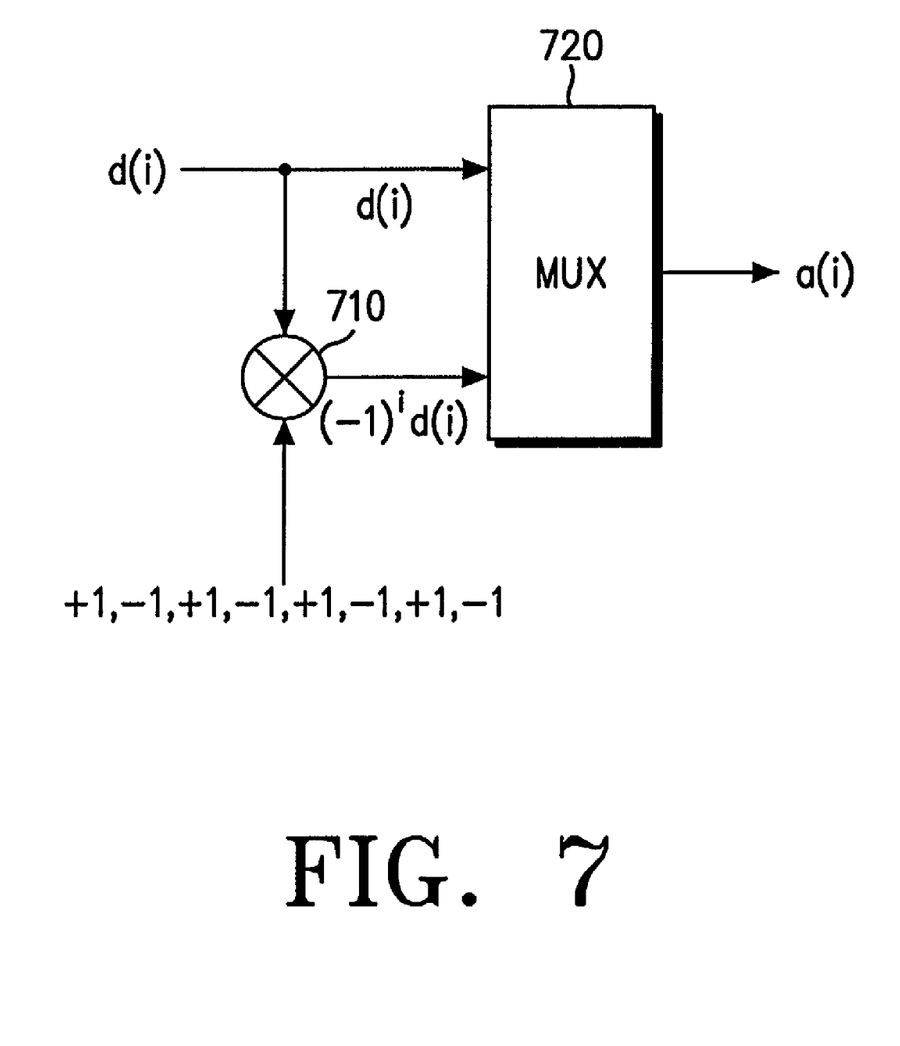
FIG. 7 illustrates a fundamental structure of a preamble generating apparatus according to another embodiment of the present invention.

In Equation (8), if $\tau'=\tau/2$ is an even number, the I value becomes '0'. Equation (8) can be implemented by a hardware structure of FIG. 7. With reference to FIG. 7, a description will be made of a fundamental structure of a preamble generating apparatus according to an embodiment of the present invention.

FIG. 7 illustrates a fundamental structure of a preamble generating apparatus according to an embodiment of the present invention. Referring to FIG. 7, an input sequence d(i) having a length of 8 is provided to both a multiplexer (MUX) 720 and a multiplier 710. At the same time, a signal of +1, −1, +1, −1, +1, −1, +1, −1, having a length of 8, is also provided to the multiplier 710. The multiplier 710 multiplies the sequence d(i) of length 8 by the signal of +1, −1, +1, −1, +1, −1, +1, −1, having a length of 8, on an element-by-element basis, and then provides its output $\{(-1)^i d(i)\}$ to the multiplexer 720. The multiplexer 720 time-multiplexes the input signal d(i) and the signal $\{(-1)^i d(i)\}$ output from the multiplier 710. That is, the multiplier 710 outputs the sequence a(i) represented by Equation (7).

If the above process is repeatedly performed on the d(i), the real part value I becomes '0' when $\tau$ is an even number. A generator for generating a complex ARM code of length 16 in this manner is illustrated in FIG. 4.

Figure 4:
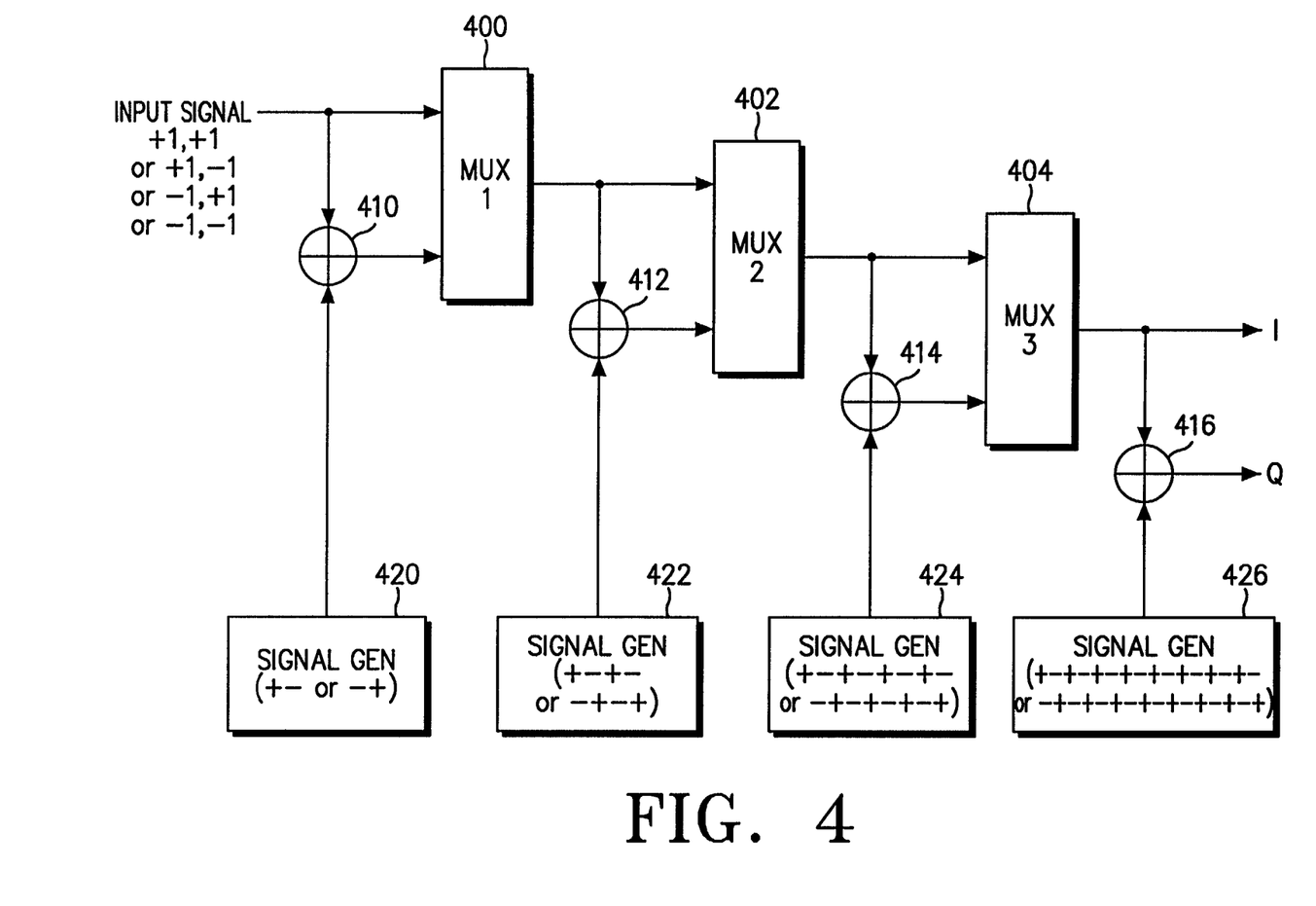
FIG. 4 illustrates a generator for generating a complex ARM code of length 16 according to an embodiment of the present invention.

FIG. 4 illustrates a generator for generating a complex ARM code of length 16 according to an embodiment of the present invention. The multiplier 610 of FIG. 6 and the multiplier 710 of FIG. 7 are provided with a signal of +1, −1, +1, −1, +1, −1, +1, −1, +1, −1, +1, −1, +1, −1, +1, −1 and a signal of +1, −1, +1, −1, +1, −1, +1, −1, respectively, each of the signals alternating between +1 and −1. Even though the order of +1 and −1 in the signals is changed, the properties represented by the equations are maintained.

Referring to FIG. 4, a selected one of the possible 2-bit combination signals {+1, +1}, {+1, −1}, {−1, +1} and {−1, −1} is simultaneously provided to a first multiplexer (MUX1) 400 and a multiplier 410 as an input signal. At the same time, the multiplier 410 is provided with a signal of {+1, −1} or {−1, +1} generated from a signal generator 420. The multiplier 410 multiplies the input signal by the signal generated from the signal generator 420, and provides its output signal to the first multiplexer 400. The first multiplexer 400 then time-multiplexes the input signal and the signal output from the multiplier 410 and outputs a 4-bit sequence. The 4-bit sequence output from the first multiplexer 400 is simultaneously provided to a second multiplexer (MUX2) 402 and a multiplier 412. At the same time, a signal of {+1, −1, +1, −1} or {−1, +1, −1, +1} generated from a signal generator 422 is provided to the multiplier 412. The multiplier 412 multiplies the 4-bit sequence output from the first multiplexer 400 by the signal generated from the signal generator 422, and provides its output to the second multiplexer 402. The second multiplexer 402 then time-multiplexes the 4-bit sequence output from the first multiplexer 400 and the signal output from the multiplier 412, and outputs an 8-bit sequence. The 8-bit sequence output from the second multiplexer 402 is simultaneously provided to a third multiplexer (MUX3) 404 and a multiplier 414. At the same time, a signal of {+1, −1, +1, −1, +1, −1, +1, −1} or {−1, +1, −1, +1, −1, +1, −1, +1} generated from a signal generator 424 is provided to the multiplier 414. The multiplier 414 multiplies the 8-bit sequence output from the second multiplexer 402 by the signal generated from the signal generator 424, and provides its output to the third multiplexer 404. The third multiplexer 404 then time-multiplexes the 8-bit sequence output from the second multiplexer 402 and the signal output from the multiplier 414, and outputs a 16-bit sequence. The intact 16-bit sequence output from the third multiplexer 404 is output as an I component. The 16-bit sequence output from the third multiplexer 404 is also provided to a multiplier 416. At the same time, the multiplier 416 is provided with a signal of {+1, −1, +1, −1, +1, −1, +1, −1, +1, −1, +1, −1, +1, −1, +1, −1} or {−1, +1, −1, +1, −1, +1, −1, +1, −1, +1, −1, +1, −1, +1, −1, +1} generated from a signal generator 426. The multiplier 416 multiplies the 16-bit sequence output from the third multiplexer 404 by the signal generated from the signal generator 426, and generates its output as a Q component, thus completing generation of a complex ARM code of length 16.

In the process of the generator illustrated in FIG. 4, if the initial 2-bit input signal is {+1, +1}, the signal generator 420 generates a signal of {+1, −1}, the signal generator 422 generates a signal of {+1, −1, +1, −1}, the signal generator 424 generates a signal of {+1, −1, +1, −1, +1, −1, +1, −1}, and the signal generator 426 generates a signal of {+1, −1, +1, −1, +1, −1, +1, −1, +1, −1, +1, −1, +1, −1, +1, −1}. Then the apparatus creates a complex ARM code of length 16 shown in Table 1.

TABLE 1

1 + j, 1 − j, 1 + j, −1 + j, 1 + j, 1 − j, −1 − j, 1 − j
1 + j, 1 − j, 1 + j, −1 + j, −1 − j, −1 + j, 1 + j, −1 + j

In addition, it is possible to create a complex ARM code of length 32 in the method described along with the structure illustrated in FIG. 7. A structure of a generator for generating a complex ARM cod of length 32 will be described with reference to FIG. 8.

Figure 8:
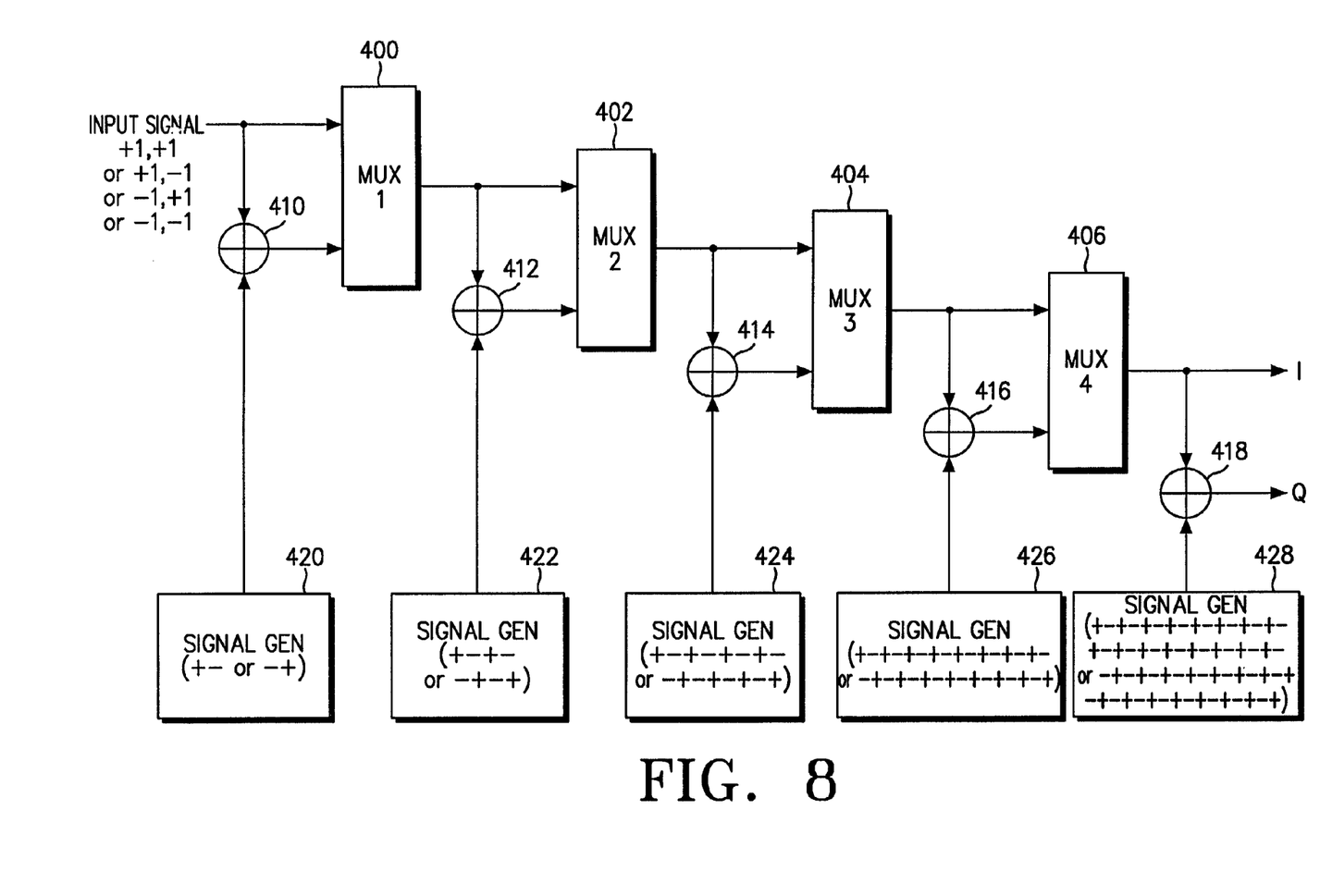
FIG. 8 illustrates a structure of a generator for generating a complex ARM code of length 32 according to another embodiment of the present invention.

FIG. 8 illustrates a structure of a generator for generating a complex ARM code of length 32 according to another embodiment of the present invention. In FIG. 8, first to third multiplexers 400–404, multipliers 410–416 and signal generators 420–426 have the same operation as described in FIG. 4, so the detailed description will be omitted for simplicity. The 16-bit sequence output from the third multiplexer 404 and the signal output from the multiplier 416 are provided to a fourth multiplexer 406. The fourth multiplexer 406 then time-multiplexes the 16-bit sequence output from the third multiplexer 404 and the signal output from the multiplier 416, and outputs a 32-bit sequence. The intact 32-bit sequence output from the fourth multiplexer 406 is output as an I component. Further, the 32-bit sequence output from the fourth multiplexer 406 is provided to a multiplier 418. At the same time, the multiplier 418 is provided with a signal of {+1, −1, +1, −1, +1, −1, +1, −1, +1, −1, +1, −1, +1, −1, +1, −1, +1, −1, +1, −1, +1, −1, +1, −1, +1, −1, +1, −1, +1, −1, +1, −1} or {−1, +1, −1, +1, −1, +1, −1, +1, −1, +1, −1, +1, −1, +1, −1, +1, −1, +1, −1, +1, −1, +1, −1, +1, −1, +1, −1, +1, −1, +1, −1, +1} generated from a signal generator 428. The multiplier 418 multiplies the 32-bit sequence output from the fourth multiplexer 406 by the signal output from the signal generator 428, and generates its output as a Q component, thus completing generation of a complex ARM code of length 32.

In the process of the generator illustrated in FIG. 8, if the initial 2-bit input signal is {+1, +1}, the signal generator 420 generates a signal of {+1, −1}, the signal generator 422 generates a signal of {+1, −1, +1, −1}, the signal generator 424 generates a signal of {+1, −1, +1, −1, +1, −1, +1, −1}, the signal generator 426 generates a signal of {+1, −1, +1, −1, +1, −1, +1, −1, +1, −1, +1, −1, +1, −1, +1, −1}, and the signal generator 428 generates a signal of {+1, −1, +1, −1, +1, −1, +1, −1, +1, −1, +1, −1, +1, −1, +1, −1, +1, −1, +1, −1, +1, −1, +1, −1, +1, −1, +1, −1, +1, −1, +1, −1}. Then the apparatus creates a complex ARM code of length 32 shown in Table 2.

TABLE 2

| |
|---|
| 1 + j, 1 − j, 1 + j, −1 + j, 1 + j, 1 − j, −1 − j, 1 − j |
| 1 + j, 1 − j, 1 + j, −1 + j, −1 − j, −1 + j, 1 + j, −1 + j |
| 1 + j, 1 − j, 1 + j, −1 + j, 1 + j, 1 − j, −1 − j, 1 − j |
| −1 − j, −1 + j, −1 − j, 1 − j, 1 + j, 1 − j, −1 − j, 1 − j |

By creating an ARM code having a length of an exponential power of 2 in this method, it is possible to create sequences of length 64, 128, 256, . . . , having an excellent aperiodic characteristic. In the forgoing description, the UTRAN (transmitter) transmits a sync code to the UE (receiver). However, it is obvious to those skilled in the art that the ARM code created according to the present invention can also be used as a preamble signal transmitted from the UE (transmitter) to the UTRAN (receiver). Therefore, if the conventional preamble generator of the transmitter (UTRAN or UE) shown in FIG. 2 includes the structure illustrated in FIG. 4 or 8 proposed by the different embodiments of the present invention, the transmitter will use the above-stated sequence having the aperiodic characteristic. In addition, if the preamble generator of the receiver (UE or UTRAN) illustrated in FIG. 3 includes the structure illustrated in FIG. 4 or 8 proposed by the different embodiments of the present invention, the receiver will use the above-stated sequence having the aperiodic characteristic.

The ARM code generators illustrated in FIGS. 4 and 8 include a plurality of cascaded multiplexers. In an alternative embodiment, however, the ARM code generator may include a single multiplexer and feed back the output of the multiplexer to its input node. In addition, though not illustrated in FIGS. 4 and 8, the ARM code generator includes a controller for controlling inputting, multiplication and multiplexing operations according to a predetermined length of the ARM code.

The foregoing embodiments of the present invention provide an apparatus and method for creating an ARM code using the hardware structure illustrated in FIGS. 4 and 8. However, in an alternative embodiment, it is possible to previously create the ARM codes proposed by the present invention and store the created ARM codes in a memory, in order to read an ARM code from the memory at the request of the system. In this case, no separate hardware structure is required, and only a memory for storing the ARM codes proposed by the invention and a control means for reading a requested ARM code from the memory are required.

The apparatus and method according to the present invention improves a characteristic of the preamble sequence by providing an aperiodic recursive multiplex (ARM) code having an excellent autocorrelation characteristic, thus contributing to improvement of the system performance. In addition, the present invention can create preamble signals having various lengths with a simple hardware structure, thereby increasing hardware efficiency. As a result, it is possible to increase sync acquisition probability by using the preamble sequence having an excellent autocorrelation characteristic.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for creating an aperiodic recursive multiplex (ARM) code having a predetermined length by receiving a first sequence having a given length, comprising the steps of:
   (a) outputting a third sequence by multiplying the first sequence by a second sequence alternating between +1 and −1, the second sequence being identical in length to the first sequence;
   (b) outputting a fourth sequence as the ARM code by time-multiplexing the first sequence and the third sequence, when the length of the fourth sequence is identical to the predetermined length.

2. The method as claimed in claim 1, wherein the first sequence is created by a selected one of possible 2-bit combinations.

3. A method for creating an aperiodic recursive multiplex (ARM) code having a predetermined length by receiving a first sequence having a given length, comprising the steps of:
   (a) outputting a third sequence by multiplying the first sequence by a second sequence alternating between +1 and +1, the second sequence being identical in length to the first sequence;
   (b) outputting a fourth sequence by time-multiplexing the first sequence and the third sequence.
   (c) re-designating the fourth sequence as the first sequence, when the length of the fourth sequence is not identical to the predetermined length, and then returning to step (a); and
   (d) outputting the fourth sequence as the ARM code, when the length of the fourth sequence is identical to the predetermined length.

4. The method as claimed in claim 3, wherein the first sequence is created by a selected one of possible 2-bit combinations.

5. An apparatus for creating an aperiodic recursive multiplex (ARM) code having a predetermined length by receiving a first sequence having a given length, comprising:
   a multiplier for outputting a third sequence by multiplying the first sequence by a second sequence alternating between +1 and −1, the second sequence being identical in length to the first sequence; and
   a multiplexer for time-multiplexing the first sequence and the third sequence multiplexer until the ARM code having the predetermined length is created.

6. The apparatus as claimed in claim 5, wherein the first sequence is created by a selected one of possible 2-bit combinations.

7. An apparatus for creating an aperiodic recursive multiplex (ARM) code having a predetermined length by receiving a first sequence having a given length, comprising:
   a multiplier for outputting a third sequence by multiplying the first sequence by a second sequence alternating between +1 and −1, the second sequence being identical in length to the first sequence;
   a multiplexer for time-multiplexing the first sequence and the third sequence; and a controller for re-designating a sequence output from the multiplexer as the first sequence and re-inputting the re-designated sequence to the multiplier and the multiplexer until the ARM code having the predetermined length is created.

8. The apparatus as claimed in claim 7, wherein the first sequence is created by a selected one of possible 2-bit combinations.

* * * * *